(12) United States Patent
McArdle et al.

(10) Patent No.: US 8,614,006 B2
(45) Date of Patent: Dec. 24, 2013

(54) CATIONICALLY CURABLE COMPOSITIONS AND A PRIMER THEREFOR

(75) Inventors: Ciaran Bernard McArdle, Dublin (IE); David Farrell, Dublin (IE)

(73) Assignee: Henkel Ireland Limited, Monheim (DE)

( * ) Notice: Subject to any disclaimer, the term of this patent is extended or adjusted under 35 U.S.C. 154(b) by 0 days.

(21) Appl. No.: 13/211,410

(22) Filed: Aug. 17, 2011

(65) Prior Publication Data

US 2012/0094137 A1 Apr. 19, 2012

Related U.S. Application Data

(63) Continuation of application No. PCT/EP2010/051809, filed on Feb. 12, 2010.

(60) Provisional application No. 61/153,177, filed on Feb. 17, 2009.

(51) Int. Cl.
*B32B 27/30* (2006.01)
*B32B 9/04* (2006.01)
*B05D 1/40* (2006.01)

(52) U.S. Cl.
USPC .......................................... 428/522; 428/704

(58) Field of Classification Search
None
See application file for complete search history.

(56) References Cited

U.S. PATENT DOCUMENTS

| | | |
|---|---|---|
| 2,628,178 A | 2/1953 | Burnett et al. |
| 2,895,950 A | 7/1959 | Krieble et al. |
| 3,218,305 A | 11/1965 | Krieble et al. |
| 3,435,012 A | 3/1969 | Nordlander |
| 3,759,914 A | 9/1973 | Simms et al. |
| 4,054,480 A | 10/1977 | Skoultchi et al. |
| 4,216,288 A | 8/1980 | Crivello |
| 4,241,204 A | 12/1980 | Crivello |
| 4,396,754 A | 8/1983 | Brownscombe |
| 4,446,246 A | 5/1984 | McGinniss |
| 4,593,052 A | 6/1986 | Irving |
| 4,717,440 A | 1/1988 | Drain et al. |
| 4,921,827 A | 5/1990 | Ali et al. |
| 4,971,892 A | 11/1990 | Ali et al. |
| 5,004,842 A | 4/1991 | Klemarczyk et al. |
| 5,135,780 A | 8/1992 | Kissel |
| 5,252,694 A | 10/1993 | Willett et al. |
| 5,310,840 A | 5/1994 | Willett et al. |
| 5,362,421 A | 11/1994 | Kropp et al. |
| 5,369,139 A | 11/1994 | Boeckeler et al. |
| 5,399,637 A | 3/1995 | Willett et al. |
| 5,453,450 A | 9/1995 | Kinzer et al. |
| 5,500,453 A | 3/1996 | Toba et al. |
| 5,506,326 A | 4/1996 | Kneafsey |
| 5,514,728 A | 5/1996 | Lamanna et al. |
| 5,521,227 A | 5/1996 | Palazzotto et al. |
| 5,523,347 A | 6/1996 | Kneafsey et al. |
| 5,691,846 A | 11/1997 | Benson, Jr. et al. |
| 5,731,042 A * | 3/1998 | Glende et al. .................. 427/470 |
| 5,739,232 A | 4/1998 | Hazell et al. |
| 6,265,459 B1 | 7/2001 | Mahoney et al. |
| 6,376,368 B1 | 4/2002 | Jung et al. |
| 6,482,868 B1 | 11/2002 | Mahoney et al. |
| 6,552,140 B1 | 4/2003 | Kneafsey et al. |
| 6,635,689 B1 | 10/2003 | Mahoney et al. |
| 6,777,027 B2 | 8/2004 | Daly et al. |
| 7,210,763 B2 | 5/2007 | Kato et al |
| 7,309,122 B2 | 12/2007 | Nakajima et al. |
| 2004/0265520 A1 | 12/2004 | Nakajima et al. |
| 2006/0167127 A1 | 7/2006 | Nguyen et al. |
| 2006/0199028 A1 | 9/2006 | Chernyshov et al. |
| 2006/0257727 A1 | 11/2006 | Uetani et al. |
| 2009/0288769 A1* | 11/2009 | Farrell et al. .................. 156/330 |
| 2009/0288770 A1 | 11/2009 | Farrell et al. |
| 2009/0288771 A1 | 11/2009 | Farrell et al. |
| 2010/0113639 A1 | 5/2010 | Doering et al. |
| 2011/0297318 A1 | 12/2011 | Barriau et al. |

FOREIGN PATENT DOCUMENTS

| | | |
|---|---|---|
| EP | 0 232 076 | 8/1987 |
| EP | 428124 | 5/1991 |
| EP | 639626 | 2/1995 |
| EP | 0764690 | 6/1999 |
| EP | 1757633 | 2/2007 |
| EP | 2 133 063 | 12/2009 |
| EP | 2 133 064 | 12/2009 |
| JP | 56168862 | 12/1981 |
| JP | 04120182 | 4/1992 |

(Continued)

OTHER PUBLICATIONS

International Search Report issued in connection with International Patent Application No. PCT/EP2010/051809 mailed Jun. 7, 2010.
International Search Report issued in connection with International Patent Application No. PCT/EP2009/056257 mailed Jul. 31, 2009.
International Search Report issued in connection with International Patent Application No. PCT/EP2010/051611 mailed May 26, 2010.
International Search Report issued in connection with International Patent Application No. PCT/EP20091056256 mailed Aug. 5, 2009.
S. Moane et al., "Decomposition of Peroxides by Transition Metal Ions in Anaerobic Adhesive Cure Chemistry", Int. J. Adh. & Adh., 19, pp. 49-57 (1999).

(Continued)

*Primary Examiner* — Sheeba Ahmed
(74) *Attorney, Agent, or Firm* — Steven C. Bauman (57) ABSTRACT

The present invention relates to one-part cationically curable compositions with storage stability, wherein cure is independent of external stimuli such as heat and UV irradiation. In particular, the present invention provides for compositions with a long shelf life that will cure only upon application of the composition to the target surface, i.e. the surface is involved in initiating cure of the cationically curable component. Suitable compositions comprise those for curing on a surface comprising carbon-halogen covalent bonds comprising a cationically curable component and a non-halide silver salt. The present invention also relates to a primer capable of promoting cure of cationically curable non-halide silver salt compositions.

17 Claims, 2 Drawing Sheets

(56) References Cited

FOREIGN PATENT DOCUMENTS

| JP | 08058023 | 3/1996 |
|---|---|---|
| WO | 8002839 | 12/1980 |
| WO | 2005070671 | 8/2005 |
| WO | 2009141444 | 11/2009 |

OTHER PUBLICATIONS

M.S. Kharash et al., "The Chemistry of Hydroperoxides. XI. Hydroperoxides As Oxiding and Reducing Agents", J. Org. Chem., vol. 17, pp. 207-220 (1952).
Rich, R.; Handbook of Adhesive Technology ed. Pizzi, A. & Mittal, K.L., Marcel Dekker (Pubs.), Chap. 29, pp. 467-479 (1994).
Haviland, G.S.; "Machinery Adhesives for Locking Retaining & Sealing", (1986).
J.V. Crivello et al., "Redox Cationic Polymerization: The Diaryliodonium Salt/Ascorbate Redox Couple", J. Polym. Sci., 19, pp. 539-548 (1981).
J.V. Crivello et al., Redox-Initiated Cationic Polymerization: The Diaryliodonium Salt/Benzoin Redox Couple, J. Polym. Sci., 21, pp. 1097-1110 (1983).
J. Collomb et al., "Cationic Polymerization Induced by Metal Salts-I", European Poly. J., vol. 16, pp. 1135-1144 (1980).
J. Collomb at al., "Cationic Polymerisation Induced by Metal Salts 2a). A Preliminary Communication on Homogeneous Systems", Makromol. Chem. Rapid Commun., 1, pp. 489-491 (1980).
P. Castell et al., "Study of lanthanide Triflates As New Curing Initiators for DGEBA", Polymer 41, pp. 8465-8474 (2000).
Holtzclaw, H.F.; Robinson, W.R.; Odom, J.D.; General Chemistry, 1991, 9th Ed., Heath (Pub.), p. 44.
J.V. Crivello and J. L. Lee, Makromol. Chem., 184, 463-473 (1983).

\* cited by examiner

CATIONICALLY CURABLE COMPOSITIONS AND A PRIMER THEREFOR

FIELD OF THE INVENTION

Inventive compositions suitable for curing on target substrates are disclosed. In particular, cationically curable compositions suitable for curing on halogenated substrates are reported herein. The invention also relates to primers for cationically curable compositions.

BACKGROUND TO THE INVENTION

Cationically curable compositions are well known in the art. Such compositions find utility as adhesives, coating agents, sealing agents and as moulding agents. Typically, cationically curable compositions are latent one-part, e.g. based on onium salt cationic initiators, which are activated thermally or photochemically, or two/multi-component systems that are activated at room temperature by mixing.

There are numerous reports in the patent literature of two-part compositions, a first part comprising a hardener and a second part comprising a cationically curable monomer, which undergo cure when both parts are mixed. For example, U.S. Pat. No. 4,396,754 discloses two-part epoxy compositions comprising Group II metal fluoroborate salts as efficient curing agents for epoxy-based curable monomers. U.S. Pat. No. 4,241,204, and International Patent Publication numbers WO8001695, and WO8002839 disclose two-part epoxy curable compositions where the curing agent is described as an onium salt/reducing agent/copper salt combination. Upon mixing both parts, the copper salt is reduced by the reducing agent which in turn reduces the onium salt, thereby initiating cure of the epoxy monomer. Separate parts of the compositions contain an integral component of the curing agent combination.

U.S. Pat. No. 4,717,440 of Drain et al. describes a two component cationically curable composition wherein a first part comprises a curable epoxy monomer and an organic halide and a second part comprises a curable epoxy monomer and a silver salt of a non-nucleophilic anion. Cure is achieved by mixing the first and second parts of the two-part composition.

Aside from the issue of packaging two separate compositions, two-part cationically curable compositions may suffer in that efficient mixing of both parts is often necessary prior to cure. Furthermore, it may be necessary for the user to vary the mixing ratios of the two components depending on the end use. Thus one-part cationically curable compositions may be desirable in situations where efficient mixing is not possible and/or to avoid mixing ratio problems.

Known methods of circumventing the problems associated with formulating both a curable monomer and a hardener into a one-part composition include activating a latent curing agent utilising heat or UV irradiation. For example, U.S. Pat. No. 3,759,914 describes heat sensitive latent amines incorporated into one-part epoxy compositions. U.S. Pat. No. 6,376,368 describes one-part epoxy compositions comprising UV sensitive latent curing agents. Irradiation of a composition comprising an N-benzylpyrazinium hexafluoroantimonate and an epoxy resin with UV light results in cure of the epoxy resin.

Primers are preparatory coatings placed on a surface to enhance or promote cure of a curable composition applied thereto. Primers are often utilised to improve adhesion to problematic substrates. Application of a primer to such problematic substrates can result in greatly improved adhesion to these substrates. Primers may be applied soon before the application of an adhesive, or parts may be pre-treated with a primer for storage with a view to subsequent application of an adhesive composition some time in the future. In the latter case the applied primer must stable such that it retains its efficacy over time.

Notwithstanding the state of the art it would be desirable to provide one-part cationically curable compositions with long term storage stability, wherein cure is independent of external stimuli such as heat and UV irradiation. In particular, it would be desirable to provide compositions with a long shelf life that will cure only upon application of the composition to the "target surface", i.e. the surface is involved in initiating cure of the cationically curable component. It would additionally be desirable to render any surface as a "target surface" through provision of suitable primer compositions for priming surfaces to which cationically curable compositions can be applied.

SUMMARY OF THE INVENTION

The present invention provides for a stable one-part composition wherein the substrate to which the composition is to be applied actively generates a curative or polymerisation initiating species.

In one aspect the present invention provides for a cationically curable composition for curing on a surface comprising carbon-halogen covalent bonds, the composition comprising:
  (i) a cationically curable component; and
  (ii) a non-halide silver salt,
wherein application of the composition to the surface initiates cure of the cationically curable component of the composition. Cure is independent of external stimuli such as heat and UV irradiation.

As used herein the term "surface comprising carbon-halogen covalent bonds" refers to any substrate with a surface layer comprising carbon-halogen covalent bonds, i.e. C—X covalent bonds, wherein X is selected from one of Cl, Br, and I. X does not embrace fluorine. It will be appreciated that a single surface may comprise different C—X bonds, for example, C—Cl, C—Br and C—I. The present invention embraces surfaces comprising C—F bonds, provided the surface also comprises at least one of C—Cl, C—Br and C—I covalent bonds, for example tetrafluoroethylene/vinyl chloride co-polymers. In general, the surface comprising carbon-halogen covalent bonds is capable of generating carbocations, more particularly carbenium ions (i.e. trivalent carbocations) in the presence of non-halide silver salts.

As used herein the term "silver halide salt" is used to mean any silver halide salt AgY wherein the anion Y is selected from Cl, Br or I. This definition excludes compound anions comprising halogens such as $ClO_4^-$, $BF_4^-$, $PF_6^-$, $SbF_6^-$, $AsF_6^-$, $(C_6F_6)_4B^-$, $(C_6F_6)_4Ga^-$, etc.

Similarly, the term "non-halide silver salt" represents a silver salt AgZ wherein Z is not Cl, Br or I. For the avoidance of doubt, Z may comprise F. As will be appreciated by a person skilled in the art, the non-halide silver salt will be chosen such that the anion of the silver salt will not result in quenching of the polymerisation process. Thus, silver salts with nucleophilic anions capable of quenching the polymerisation process would not be suitable in compositions of the present invention.

Desirably, the compositions disclosed herein are one-part compositions. Such one-part compositions are stable one-part cationically curable compositions with a sufficiently long-shelf life. The compositions of the present invention do not require additional components such as organic halides to initiate cure. The compositions are stable until applied to a surface comprising carbon-halogen covalent bonds which is capable of generating carbocations (on the surface and thus in the composition) in the presence of non-halide silver salts.

Advantageously, the compositions of the present invention do not comprise UV or heat activable latent curing agents. Prior art compositions tend to comprise UV or heat activable latent curing agents. UV or heat activable latent curing components are not required in the compositions of the present invention because the halogenated substrate to which the substrate is applied actively generates a curative. Furthermore, the compositions of the present invention do not require the application of temperature or UV light to initiate cure. As used herein the term "UV or heat activable latent curing agent" is used to mean any substance that is activable from a latent inactive state, for storage, to an active state upon the application of UV light or heat, thereby initiating cure of the composition—it will be appreciated that the substrate to which the composition is applied does not participate in the cure of the composition.

The compositions of the present invention can thus be utilized in any application in which curing on a surface comprising carbon-halogen covalent bonds is required. The compositions of the invention are storage stable as a one-part composition. The compositions of the present invention require no special packaging unlike prior art compositions, which tend to be multi-component compositions.

The non-halide silver salt of the compositions of the present invention may be present in 0.1 to 30% w/w, suitably 0.1 to 20% w/w, such as 0.1 to 10% w/w, for example from 0.5 to 3.0% w/w. The fixture rate of compositions according to the present invention may be altered by varying the concentration of non-halide silver salt formulated therein. For example, increasing the concentration of non-halide silver salt may increase the fixture rate. The cure strength of the compositions of the present invention may be altered by varying the concentration of non-halide silver salt formulated therein. For example, increasing the concentration of non-halide silver salt may increase the bond strength.

The non-halide silver salt of the composition of the present invention may comprise a counterion chosen from the group consisting of $ClO_4^-$, $BF_4^-$, $PF_6^-$, $SbF_6^-$, $AsF_6^-$, $(C_6F_5)_4B^-$, $(C_6F_6)_4Ga^-$, carborane, triflimide, bis-triflimide, and combinations thereof. Desirably, the counterion is selected from the group consisting of $BF_4^-$, $PF_6^-$, $SbF_6^-$ and combinations thereof. Further desirably, the counterion is $SbF_6^-$.

The non-halide silver salt of the composition of the present invention may be substituted with a ligand. The ligand may be selected from the group consisting of alkenes, nitriles, crown ethers (cyclic and acyclic), polyalkylene oxides and combinations thereof. Suitable ligands may include, 1,5-cyclooctadiene (1,5-COD), 1,7-octadiene (1,7-OCT), acetonitrile, 15-crown-5, polyethylene oxide, polypropylene oxide, polyethylene glycol and combinations thereof. The ligand may be 1,5-cyclooctadiene (1,5-COD) or 1,7-octadiene (1,7-OCT). The solubility of the non-halide silver salt in the composition of the present invention may be modified by changing the counterion of the non-halide silver salt, the addition of ligands to the non-halide silver salt, the substitution of ligands on the non-halide silver salt and combinations thereof.

The present invention also embraces embodiments wherein the ligating materials (supra) form part of a cationically curable monomer/component in the composition of the present invention. For example, the non-halide silver salt may be ligated with polyethylene glycol units having cationically polymerisable functional groups tethered thereto.

Preferably, the cationically curable component has at least one functional group selected from the group consisting of epoxy, vinyl, vinyl ether, oxetane, thioxetane, episulfide, tetrahydrofuran, oxazoline, oxazine, lactone, trioxane, dioxane, styrene and combinations thereof. Further preferably, the cationically curable component has at least one vinyl ether functional group. Advantageously, vinyl ethers greatly increase the rate of cure and the strength of cure of the compositions of the present invention.

Desirably, the vinyl ether component is selected from the group consisting of 1,4-Butanediol divinyl ether, 1,4-Butanediol vinyl ether, bis-(4-vinyl oxy butyl) adipate, Ethyl-1-propenyl ether, bis-(4-vinyl oxy butyl) isophthalate, Bis[4-(vinyloxy)butyl]succinate, Bis[4-(vinyloxy)butyl] terephthalate, Bis[[4-[(vinyloxy)methyl]cyclohexyl]methyl] isophthalate, Bis[[4-[(vinyloxy)methyl]cyclohexyl]methyl] glutarate, triethylene glycol divinyl ether, Tris(4-vinyloxybutyl)trimellitate, VEctomer™ 2020 (CAS no 143477-70-7) and combinations thereof.

In one embodiment, the vinyl ether component may be selected from 1,4-butanediol divinyl ether, 1,4-butanediol vinyl ether, or triethylene glycol divinyl ether.

In one embodiment, the composition of the present invention comprises a vinyl ether component and at least one other cationically curable component selected from the group consisting of epoxy, vinyl, oxetane, thioxetane, episulfide, tetrahydrofuran, oxazoline, oxazine, lactone, trioxane, dioxane, styrene and combinations thereof. In an exemplary embodiment, the composition of the present invention comprises both a vinyl ether component and an epoxy component or an oxetane component. Preferably, the composition of the present invention comprises both a vinyl ether component and an epoxy component.

The surface comprising carbon-halogen covalent bonds to which compositions according to the present invention are applied may be selected from the group consisting of halogenated macromolecular systems, halogenated rubbers (synthetic and natural), halogenated elastomers, halogenated polymers, polyvinylchloride, polyvinylbromide, polyvinyliodide, polyvinylidene chloride, co-polymers derived from vinyl chloride or vinylidene chloride, polymers plasticised with or compounded with halogenated polymers such as polyvinylchloride, polyvinylidene chloride or co-polymers thereof, polymer alloys plasticised with or compounded with halogenated polymers such as polyvinylchloride, polyvinylidene chloride or co-polymers thereof, and combinations thereof. A halogenated polymer or halopolymer is a material comprising carbon-halogen bonds as defined herein (vide supra), having a halogen content of at least 1% by weight. Desirably, the surface comprising carbon-halogen covalent bonds comprises polyvinylchloride (PVC), polyvinylidene chloride or copolymers thereof. PVC is an inexpensive, readily available commercial substrate. Polyvinylidene chloride is extensively used in packaging applications.

In one embodiment, the curable compositions of the present invention are suitable for adhering a first substrate having a surface comprising carbon-halogen covalent bonds to a second substrate, such as a substrate having a surface comprising carbon-halogen covalent bonds. In a further embodiment, the curable composition of the present invention is suitable for adhering a first substrate having a surface comprising carbon-halogen covalent bonds to a second substrate which does not comprise carbon-halogen covalent bonds. Substrates that do not comprise carbon-halogen covalent bonds, or non-halogenated substrates, include but are not limited to polymers, plastics, metals, metal oxides, metal alloys, elastomers, rubbers (synthetic or natural), glass, ceramics, leathers and wood. The inventive compositions described herein will generally be useful as adhesives or coatings. They can be used in a wide range of industrial applications including structural bonding. Moreover, the inventive compositions of the present invention can be utilised as coatings, for example to form (polymer) coatings on surfaces comprising carbon-halogen covalent bonds.

The compositions of the present invention are highly advantageous in adhesive applications to substrates having surfaces comprising carbon-halogen covalent bonds, exhibiting rapid cure times with excellent cure strength achievable in 10 minutes at ambient temperature.

The inventive compositions may be used in a pre-applied format. In one embodiment this may comprise pre-applying the composition of the present invention to a non-halogenated substrate, such that it remains secured thereto, and subsequently mating it with a halogenated substrate or substrate primed with a primer containing PVC, polyvinylidene chloride, co-polymers thereof or combinations thereof (vide infra), to initiate cure of the composition of the present invention. Securing of the composition of the present invention to the non-halogenated substrate may by achieved by means of a binder or any other means known by persons skilled in the art.

It will be appreciated by a person skilled in the art that one-part cationically curable compositions of the present invention may additionally comprise conventional additives such as fillers, pigments, stabilisers, moisture scavengers, etc., subject to said additives not interfering with effective curing of the compositions. Accordingly, such additives will be substantially free of carbon-halogen covalent bonds.

Desirably, the compositions of the present invention will be stored in containers which are substantially opaque. As will be appreciated by a person skilled in the art, suitable containers will be free of materials comprising carbon-halogen bonds as defined herein (supra).

In a further aspect, the present invention provides for use of a non-halide silver salt in a cationically curable composition for curing on a surface comprising carbon-halogen covalent bonds. The non-halide silver salt may comprise a counterion chosen from the group consisting of $ClO_4^-$, $BF_4^-$, $PF_6^-$, $AsF_6^-$, $(C_6F_5)_4B^-$, $(C_6F_5)_4Ga^-$, carborane, triflimide, bis-triflimide, and combinations thereof. Desirably, the counterion is selected from the group consisting of $PF_6^-$, $BF_4^-$, $SbF_6^-$ and combinations thereof. Further desirably, the counterion is $SbF_6^-$. The non-halide silver salt may be substituted with a ligand. The ligand may be selected from the group consisting of alkenes, nitriles, crown ethers (cyclic and acyclic), polyalkylene oxides and combinations thereof. Suitable ligands may include, 1,5-cyclooctadiene (1,5-COD), 1,7-octadiene (1,7-OCT), acetonitrile, 15-crown-5, polyethylene oxide, polypropylene oxide, polyethylene glycol and combinations thereof. The ligand may be 1,5-cyclooctadiene (1,5-COD) or 1,7-octadiene (1,7-OCT).

In a further aspect the invention extends to an assembly comprising a first substrate and a second substrate bonded together by the composition of the present invention. The invention also provides for a cure product of the composition of the present invention.

In yet a further aspect, the invention provides for a process for bonding two substrates together comprising the steps of:
 (i) applying a composition according to the present invention comprising:
  i) a cationically curable component; and
  ii) a non-halide silver salt,
 to at least one substrate, and
 (ii) mating the first and second substrates so as to form a bond with the composition,
 wherein at least one substrate has a surface comprising carbon-halogen covalent bonds.

In one embodiment of the process of the present invention, both substrates have surfaces comprising carbon-halogen covalent bonds. In an alternative embodiment, the first substrate has a surface comprising carbon-halogen covalent bonds and the second substrate does not comprise carbon-halogen covalent bonds. Suitable non-halogenated substrates include but are not limited to polymers, plastics, metals, metal alloys, metal oxides, elastomers, rubbers (synthetic or natural), glass, ceramics, leathers and wood.

The invention further provides for a pack comprising:
 i) a container; and
 ii) a cationically curable composition according to the present invention.

Desirably, the container of the pack of the present invention is substantially opaque. Suitable containers will be free of materials comprising carbon-halogen bonds within the definition of the present invention.

In a further aspect the present invention provides for curing on a substrate comprising the steps of:
 (i) applying a primer comprising polyvinylchloride, polyvinylidene chloride, co-polymers thereof or combinations thereof to the substrate; and
 (ii) applying a composition according to the present invention comprising:
  i) a cationically curable component; and
  ii) a non-halide silver salt,
 onto said primer.

In a further aspect the present invention provides for a process for bonding two substrates together comprising the steps of:
 (i) applying a primer comprising polyvinylchloride, polyvinylidene chloride, co-polymers thereof or combinations thereof to at least one substrate;
 (ii) applying a composition according to the present invention comprising:
  i) a cationically curable component; and
  ii) a non-halide silver salt,
 to at least one substrate, and
 (iii) mating the first and second substrates so as to form a bond with the composition.

As used herein, the term "applying a primer comprising polyvinylchloride, polyvinylidene chloride, co-polymers thereof or combinations thereof" refers to applying an amount of polyvinylchloride, polyvinylidene chloride, co-polymers thereof or combinations thereof to a surface for subsequent application of a cationically curable composition according to the present invention. For example, the primer comprising polyvinylchloride/polyvinylidene chloride may be applied as a deposit, monolayer, thin film, layer, etc. Suitably, a primer comprising polyvinylchloride/polyvinylidene chloride may be applied to the surface of a first substrate for the purpose of priming said first substrate for subsequent bonding to a second substrate.

The primer comprising polyvinylchloride/polyvinylidene chloride may be applied to at least one substrate in sufficient quantities so as to promote cure of the cationically curable composition according to the present invention. The primer comprising polyvinylchloride/polyvinylidene chloride may be applied to those areas of a first substrate intended for subsequent cure of the composition of the present invention, for example for bonding to a second substrate. The polyvinylchloride/polyvinylidene chloride primer may be applied to one substrate. Desirably, for bonding in particular, the polyvinylchloride/polyvinylidene chloride primer is applied to both substrates. The term "polyvinylchloride/polyvinylidene chloride primer" refers to a primer comprising polyvinylchloride, polyvinylidene chloride, co-polymers thereof or combinations thereof.

Advantageously, applying a polyvinylchloride/polyvinylidene chloride primer to substrates may result in faster fixture/cure times, particularly in production and automated processes. For example, fixture times for metal to metal bonding using the process of the present invention can be achieved in less than five minutes.

The primer comprising polyvinylchloride/polyvinylidene chloride may be applied to the at least one substrate in a suitable carrier. For example, the carrier may be a solvent, a wetting agent or a dispersing medium. The solvent may be selected from the group consisting of water, THF, methyl ethyl ketone and combinations thereof. For polyvinylchloride, the solvent is desirably selected from the group consisting of THF, methyl ethyl ketone and combinations thereof.

In a primer composition comprising polyvinylchloride/polyvinylidene chloride and a carrier the concentration of the polychloride material relative to the carrier is low. For example, polyvinylchloride, polyvinylidene chloride, co-polymers thereof or combinations thereof may comprise 1 to 20% w/w of the composition, for example 1 to 10% w/w of the composition, such as 1 to 5% w/w of the composition.

Suitable substrates may be selected from the group consisting of plastics, rubbers (synthetic or natural), elastomers, polymers, metals, metal alloys, metal oxides, glass, ceramics, leathers and wood.

In a preferred embodiment both substrates are metals. At least one metal substrate has a primer comprising polyvinylchloride/polyvinylidene chloride applied thereto. Desirably, both metal substrates have a primer comprising polyvinylchloride/polyvinylidene chloride applied thereto. Fixture/cure times between the two metal substrates can be achieved with a twenty-fold increase in fixture rate relative to the non-primed metal substrates. For example, 2 to 20 fold, such as 5 to 20 fold, more particularly 10 to 20 fold increases in fixture times are observable relative to non-primed metal substrates.

In comparison to prior art process for metal to metal bonding this represents a significant increase in the rate of fixture. Furthermore, in less than 5 minutes the inventive process of the present invention provides for bond strengths comparable to those obtained from prior art metal to metal bonding processes after a period of 72 hours.

In a further aspect the present invention provides for a substrate having a primer comprising polyvinylchloride/polyvinylidene chloride applied thereto for the purpose of priming said substrate for subsequent bonding to a second substrate using the curable composition of the present invention. The substrate may comprise carbon-halogen bonds. The substrate may not comprise carbon-halogen bonds. The second substrate may, or may not comprise carbon-halogen bonds.

The present invention further provides for a process of priming a substrate for subsequent bonding to a second substrate using the curable composition of the present invention, comprising applying a primer composition comprising polyvinylchloride/polyvinylidene chloride to the substrate. As used herein the term "primer composition comprising polyvinylchloride/polyvinylidene chloride" refers to polyvinylchloride, polyvinylidene chloride, co-polymers thereof or combinations thereof in a suitable carrier medium for application to a surface as a primer.

In a further aspect the invention extends to an assembly comprising a first substrate and a second substrate bonded together by the composition of the present invention, wherein at least one substrate has a primer comprising polyvinylchloride/polyvinylidene chloride applied thereto. The present invention also provides for a cure product of a curable composition according to the present invention and a primer comprising polyvinylchloride/polyvinylidene chloride.

The invention further provides for use of a primer composition comprising polyvinylchloride/polyvinylidene chloride for the purpose of priming a first substrate for subsequent bonding to a second substrate using the curable composition of the present invention.

In a further aspect the present invention provides for a process for bonding two substrates together comprising the steps of:
(i) applying a primer composition comprising polyvinylchloride and a carrier to at least one substrate;
(ii) allowing the primer composition to evaporate at ambient temperature;
(iii) applying a composition according to the present invention comprising:
   i) a cationically curable component; and
   ii) a non-halide silver salt,
to at least one substrate, and
(iv) mating the first and second substrates so as to form a bond with the composition.

The invention further relates to a kit comprising:
i) a cationically curable composition according to the present invention;
ii) a primer composition comprising polyvinylchloride, polyvinylidene chloride, co-polymers thereof or combinations thereof; and optionally
iii) an applicator means for applying the primer composition to a substrate.

The inventive primers and priming compositions of the present invention may be used in a pre-applied format. For example, this may involve pre applying a primer comprising polyvinylchloride/polyvinylidene chloride to a non halogenated substrate, such that it remains secured thereto. The primed substrate may be stored, and subsequently contacted with the cationically curable composition of the present invention for subsequent bonding to a second substrate. Advantageously, substrates can be primed in a pre-treatment process and subsequently utilised in (automated) manufacturing processes.

The term primer comprising polyvinylchloride/polyvinylidene chloride refers to primers comprising polyvinylchloride, polyvinylidene chloride, or co-polymers derived from polyvinylchloride or polyvinylidene chloride, and also embraces combinations of these materials.

Where suitable, it will be appreciated that all optional and/or preferred features of a first embodiment of the invention may be combined with optional and/or preferred features of another/other embodiment(s) of the invention.

BRIEF DESCRIPTION OF THE DRAWINGS

Additional features and advantages of the present invention are described in, and will be apparent from, the detailed description of the invention and from the drawings in which.

DETAILED DESCRIPTION OF THE INVENTION

It should be readily apparent to one of ordinary skill in the art that the compositions exemplified in the examples herein under represent generalised examples of the invention only, and that other compositions of varying concentration are possible and embraced by the present invention.

Figure 1:
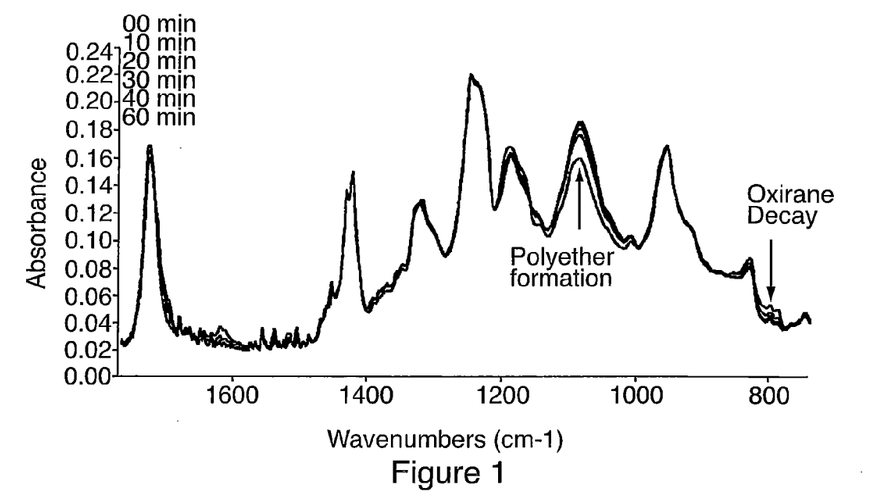
FIG. 1 illustrates polyether formation and oxirane decay over time in a composition of the present invention as monitored by IR spectroscopy.

Infrared monitoring of a curable epoxy composition comprising a silver salt is shown in FIG. 1. IR spectra were taken at 0, 10, 20, 30, 40 and 50 minutes respectively. The regions from 1040-1140 $cm^{-1}$ and 780-815 $cm^{-1}$ represent polyether formation, i.e. cure of the composition, and oxirane decay respectively. The views of these regions are expanded in FIGS. 2 and 3.

Figure 2:
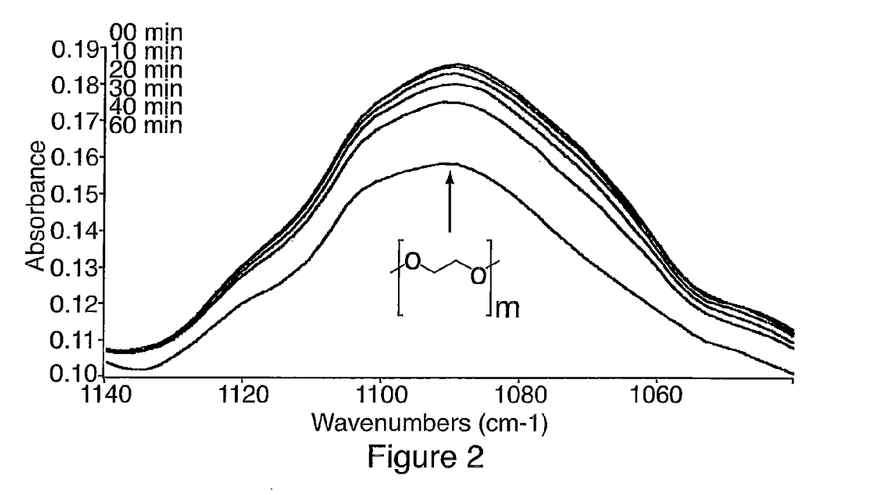
FIG. 2 is an expansion of the region depicting polyether formation in FIG. 1.

FIG. 2 illustrates rapid polyether formation after a matter of minutes. The lowest spectrum in FIG. 2 illustrates the absorbance due to polyether functionality at 0 mins. The second lowest spectrum was taken after 10 mins showing a large increase in polyether absorbance. The increase in polyether absorbance from 10 to 20 mins, et seq. up to 50 mins shows very little variation indicating that polyether formation is rapid.

Figure 3:
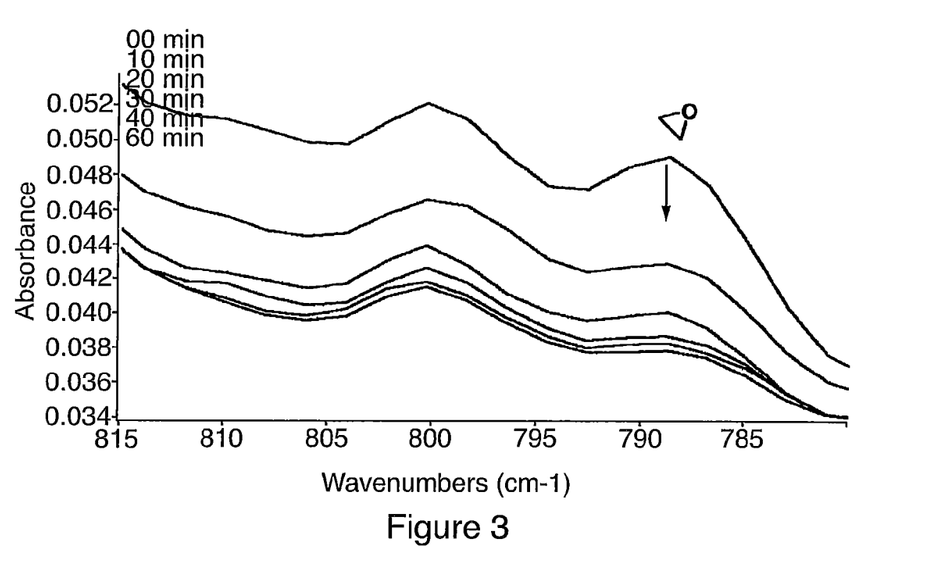
FIG. 3 is an expansion of the region showing oxirane decay in FIG. 1.

Similarly, in FIG. 3 the region of the spectrum showing oxirane decay has been highlighted. The uppermost spectrum in FIG. 3 illustrates the absorbance due to oxirane functionality at 0 mins. The second highest spectrum was taken after 10 mins showing a large decrease in oxirane absorbance. The decrease in oxirane absorbance from 10 to 20 mins, et seq. up to 50 mins shows very little variation. Thus, FIGS. 2 and 3 show that increased polyether concentration is concomitant with a decrease in oxirane concentration.

COMPOSITION EXAMPLES

Lap shear tests were performed to evaluate the tensile shear bond strength of cured compositions according to the present invention when applied to halogenated substrates as illustrated below. The halogenated substrates were bonded together using compositions of the present invention, and the specific halogenated substrates tested are noted below.

In general, the bond strength was so high at 1.27 cm (½") overlap that the strength of the substrate was being measured and not the adhesive strength, i.e. the lapshears could not be separated until the substrate breaks. Therefore lap shear tests had to be performed at 0.635 cm (¼") overlap to provide a smaller bond area. All halogenated substrates were wiped with IPA and allowed to dry before the compositions were applied.

The compositions utilised in each example are shown adjacent the result tables below. In general, the silver metal salt was dissolved in the cationically curable monomer or a mixture of monomers. For example, [Ag(1,5-cyclooctadiene)$_2$] SbF$_6$ (0.24 g, 0.43 mmol) was dissolved in the cycloaliphatic diepoxy monomer Cyracure 6110 [3,4-epoxycyclohexylmethyl-3,4-epoxycyclohexane carboxylate] (8.0 g) and 1,4-Butanediol divinyl ether (2.0 g) and utilised in some of the examples below.

General Procedure for Testing Formulations:

A standard test method was followed for testing all adhesive formulations based on ASTM E177 and ASTM E6.

Apparatus

Tension testing machine, equipped with a suitable load cell. Assembly procedure

1. Five test specimens were used for each test.
2. Specimen surface was prepared where necessary. Test specimens were cleaned by wiping with isopropanol and allowed to dry in air before assembly.
3. Bond area on each lap-shear is as indicated below. This is marked before applying the adhesive sample.
4. A sufficient quantity of adhesive was applied to the prepared surface of one lap-shear.
5. A second lap-shear was placed onto the adhesive and the assembly was clamped on each side of the bond area.

Test Procedure:

After allowing for cure as specified in test program the shear strength was determined as follows:

1. The test specimen was placed in the grips of the testing machine so that the outer 25.4 mm (1 in.) of each end were grasped by the jaws. The long axis of the test specimen coincided with the direction of applied tensile force through the centre line of the grip assembly.
2. The assembly was tested at a crosshead speed of 2.0 mm/min or 0.05 in./min., unless otherwise specified.
3. The load at failure was recorded.

Results:

Values in bold and underline indicate substrate failure at this pressure rather than bond failure. All load values are reported as $N/mm^2$.

Legend:
(8-15)=Cyracure 6110, cycloaliphatic epoxy monomer: 3,4-epoxycyclohexylmethyl-3,4-epoxycyclohexane carboxylate;

DVE=1,4-Butanediol Divinyl Ether;

A=Average;

D.S.=Standard Deviation; and

1, #2, #3, #4 and #5 represent the replicate number for each particular test. Typically, five replicates were performed and an average value was calculated therefrom.

Example 1

Tensile Shear on PVC (1.27 cm or ½ inch)

| Test # | Time: Hours | | | |
|---|---|---|---|---|
| | 0.167 | 0.5 | 1 | 24 |
| #1 | 0.98 | 2.39 | 3.36 | 7.34 |
| #2 | 1.33 | 1.14 | 2.75 | 4.49 |
| #3 | 1 | 1.55 | 3.22 | 7.05 |
| #4 | 2.17 | 2.07 | 2.43 | 6.62 |
| #5 | 0.93 | 1.87 | 2.87 | 6.56 |
| A | 1.282 | 1.804 | 2.926 | 6.412 |
| D.S. | 0.521 | 0.481 | 0.372 | 1.121 |

| Composition | |
|---|---|
| 77.6 g | (8-15) |
| 20.0 g | DVE |
| 2.4 g | Ag(1,5-COD)2 SbF6 |

As is evident from the above table tests at 0.5 hrs, 1 hr and 24 hrs invariably resulted in failure of the PVC substrate rather than bond failure, such was the bond strength. Testing at 0.635 cm or ¼ inch overlap was subsequently performed in an attempt to minimise PVC failure.

Example 2

Tensile Shear PVC (0.635 cm or ¼ inch)

|       | Time: Hours |       |       |        |
|-------|-------------|-------|-------|--------|
| Test # | 0.167      | 0.5   | 1     | 24     |
| #1    | 0.41        | 4.16  | 2.22  | 10.3   |
| #2    | 1.1         | 6.3   | 4.62  | 10.53  |
| #3    | 2.6         | 2.78  | 7.59  | 10.89  |
| #4    | 1.52        | 1.98  | 3.23  | 11.25  |
| #5    |             | 2.32  | 4.53  | 10.49  |
| A     | 1.408       | 3.508 | 4.438 | 10.692 |
| D.S.  | 0.917       | 1.768 | 2.022 | 0.378  |

| Composition |                   |
|-------------|-------------------|
| 77.6 g      | (8-15)            |
| 20.0 g      | DVE               |
| 2.4 g       | Ag(1,5-COD)2 SbF6 |

Lapshear tests at 0.635 cm or ¼ inch overlap illustrate considerable bond strength up to 1 hour. Testing at 24 hours resulted in exclusively in failure of the PVC substrate rather than bond failure—again indicating the considerable cure strength of the compositions of the present invention.

Example 3

Tensile Shear on Teflon® (0.635 cm or ¼ inch)

|       | Time: Hours |
|-------|-------------|
| Test # | 24         |
| #1    | NOT CURED   |
| #2    |             |
| #3    |             |
| #4    |             |
| #5    |             |
| A     |             |
| D.S.  |             |

| Composition |                   |
|-------------|-------------------|
| 77.6 g      | (8-15)            |
| 20.0 g      | DVE               |
| 2.4 g       | Ag(1,5-COD)2 SbF6 |

Example 4

Tensile Shear on Polyethylene (0.635 cm or inch)

|       | Time: Hours |
|-------|-------------|
| Test # | 24         |
| #1    | NOT CURED   |
| #2    |             |
| #3    |             |
| #4    |             |
| #5    |             |
| A     |             |
| D.S.  |             |

| Composition |                   |
|-------------|-------------------|
| 77.6 g      | (8-15)            |
| 20.0 g      | DVE               |
| 2.4 g       | Ag(1,5-COD)2 SbF6 |

Examples 3 and 4 above illustrate substrates on which the silver salt compositions of the present invention failed to cure. Fluorinated surfaces such as Teflon® fail to initiate cure of the cationically curable compositions comprising non-halide silver salts. Similarly, halogen free surfaces such as polyethylene do not initiate cure of the cationically curable monomer in the presence of non-halide silver salts.

Example 5

Tensile Shear PVC (0.635 cm or ¼ inch)

|       | Time: Hours |       |        |        |
|-------|-------------|-------|--------|--------|
| Test # | 0.167      | 0.5   | 1      | 24     |
| #1    | 0.84        | 2.06  | 5.34   | 11.04  |
| #2    | 4.14        | 4.66  | 4.77   | 10.54  |
| #3    | 2.43        | 4.55  | 7.83   | 8.76   |
| #4    | 1.59        | 6.97  | 7.13   | 12.27  |
| #5    | 3.13        | 3.39  | 5.01   | 5.04   |
| A     | 2.426       | 4.326 | 6.016  | 9.530  |
| D.S.  | 1.289       | 1.814 | 1.374  | 2.809  |

| Composition |                   |
|-------------|-------------------|
| 77.6 g      | (8-15)            |
| 20.0 g      | DVE               |
| 2.4 g       | Ag(1,7-OCT)2 SbF6 |

Changing the silver salt ligand from 1,5-Cyclooctadiene (COD) to 1,7-OCT has a pronounced effect on the bond strength between PVC samples as shown in Example 5. After 10 mins (0.167 hrs) substrate failure rather than bond failure was observable. After 30 mins (0.5 hrs) 4 out of 5 tests resulted in substrate failure over bond failure. Comparison of Example 5 and Example 2 illustrates the significant increase in bond strength resulting from changing the ligand from 1,5-COD to 1,7-OCT.

Example 6

Tensile Shear PVC (0.635 cm or ¼ inch)

|       | Time: Hours |       |
|-------|-------------|-------|
| Test # | 1          | 24    |
| #1    | 0.3         | 3.09  |
| #2    | 0.65        | 2.47  |
| #3    | 1.6         | 2.68  |
| #4    |             | 2.48  |
| #5    |             |       |
| A     | 0.850       | 2.680 |
| D.S.  | 0.673       | 0.290 |

-continued

| Composition | |
|---|---|
| 97.6 g | (8-15) |
| 2.4 g | Ag(1,5-COD)2 SbF6 |

Example 6 provides the results of a series of tests utilising a 1,4-Butanediol Divinyl Ether (DVE) free composition. The composition cures on PVC albeit at a slower rate and with a resultant weaker bond strength when compared to analogous compositions comprising DVE. Testing at 1 hr and 24 hrs illustrates moderate bond strength on PVC samples However, none of the tests involving DVE free compositions provided for substrate failure prior to bond failure indicating that in the absence of DVE the bond strength is weaker.

Example 7

Tensile Shear PVC (0.635 cm or ¼ inch)

| Test # | Time: Hours | |
|---|---|---|
| | 24 | 48 |
| #1 | NOT CURED | |
| #2 | | |
| #3 | | |
| #4 | | |
| #5 | | |
| A | | |
| D.S. | | |

| Composition | |
|---|---|
| 77.6 g | (8-15) |
| 20.0 g | DVE |
| 2.4 g | Cu(1,5-COD)2 BF4 |

Example 8

Tensile Shear PVC (0.635 cm or ¼ inch)

| Test # | Time: Hours | |
|---|---|---|
| | 24 | 48 |
| #1 | NOT CURED | |
| #2 | | |
| #3 | | |
| #4 | | |
| #5 | | |
| A | | |
| D.S. | | |

| Composition | |
|---|---|
| 77.6 g | (8-15) |
| 20.0 g | DVE |
| 2.4 g | Cu(1,5-COD)2 ClO4 |

Examples 7 and 8 illustrate the test results for compositions comprising copper salts. Neither composition demonstrated cure when applied to PVC substrates. Changing the counterion from tetrafluoroborate to perchlorate had no effect. Thus, PVC is incapable of promoting cure of cationically curable compositions comprising copper salts.

Example 9

Tensile Shear PVC (0.635 cm or ¼ inch)

| Test # | Time: Hours |
|---|---|
| | 24 |
| #1 | NOT CURED |
| #2 | |
| #3 | |
| #4 | |
| #5 | |
| A | |
| D.S. | |

| Composition | |
|---|---|
| 77.6 g | (8-15) |
| 20.0 g | DVE |
| 2.4 g | Rhodorsil® 2074 |

Example 9 illustrates the results of testing a composition wherein the silver salt of previous examples has been replaced with Rhodorsil® 2074. This is a siloxane based cationic photoinitiator catalyst (available from Rhodia). No cure was observed on PVC.

Example 10

Varying Substrates and Silver Concentrations

| Substrate Tested | Time | |
|---|---|---|
| | 20 mins | 24 hours |
| Glass-Glass | — | — |
| Glass-PVC | — | — |
| Polycarbonate-PVC | — | Bonding observed after 48 h |
| PVC-PVC | — | Bonding observed |

| Composition | |
|---|---|
| 79.4% | (8-15) |
| 20.0% | Triethylene Glycol Divinyl Ether |
| 0.6% | AgSbF6 |

Example 11

Varying Substrates and Silver Concentrations

| Substrate Tested | Time | |
|---|---|---|
| | 20 mins | 24 hours |
| Glass-Glass | — | — |
| Glass-PVC | — | Bonding observed |

| | | | |
|---|---|---|---|
| Polycarbonate-PVC | — | Bonding observed after 48 h | |
| PVC-PVC | Bonding observed | Bonding observed | |

| Composition | |
|---|---|
| 77.6% | (8-15) |
| 20.0% | Triethylene Glycol Divinyl Ether |
| 2.4% | AgSbF6 |

In Example 10a composition comprising only 0.6% AgSbF$_6$ was tested in bonding a number of surfaces together. As expected, the silver salt composition was ineffective in promoting bonding between two glass substrates. The same composition comprising 0.6% AgSbF$_6$ was ineffectual at promoting bonding between glass and PVC. The 0.6% silver composition was effective at promoting bonding between two PVC substrates and polycarbonate and PVC substrates.

In Example 11a composition comprising 2.4% AgSbF$_6$ was tested using the same substrate rang as shown in Example 10. Naturally, the silver salt composition was ineffective in promoting bonding between two glass substrates. The same composition comprising 2.4% AgSbF$_6$ was effective at promoting bonding between glass and PVC. However, the bond was found to be weak. The 2.4% silver composition was also effective at promoting bonding between two PVC substrates and polycarbonate and PVC substrates.

Primer Examples

Tests to determine the efficacy of the cationically curable silver salt compositions of the present invention on substrates not comprising carbon-halogen bonds coated with a PVC priming solution are detailed below. Surfaces were cleaned with isopropyl alcohol before application of the primer. The surfaces were primed by uniformly spreading 0.5 ml of a 5% solution of PVC in THF (or methyl ethyl ketone) over the substrate bond area. The substrate was allowed to dry in air for 10 min (to allow for evaporation of the solvent) before adhesive application and bonding.

The bond overlap between the two substrates was 1.27 cm (½"). The bond strengths shown in Example 12 are given in N/mm². Bond strength was measured after approximately 24 hours.

Example 12

Various Substrates with PVC Primers Applied Thereto

| Example | Substrate | Unprimed substrate bond strength | PVC primer substrate bond strength |
|---|---|---|---|
| 12a | PVC | 6.0 | 6.0 |
| 12b | Polypropylene | 0 | 0.4 |
| 12c | Polyethylene | 0 | 0.4 |
| 12d | Polycarbonate | 0 | 1.9 |
| 12e | Perspex | 0 | 1.0 |
| 12f | Acrylonitrile Butadiene Styrene | 0 | 3.0 |
| 12g | Nylon 6,6' | 0 | 0.3 |
| 12h | E-coated Steel | 0 | 10.0 |
| 12i | Polyacetal | 0 | 0.5 |
| 12j | 30% Glass filled Polypropylene | 0 | 0.5 |

| Composition | |
|---|---|
| 77.6% | (8-15) |
| 20.0% | 1,4-butanediol-divinylether |
| 2.4% | AgSbF6 |

Example 12a with PVC represents the control. The PVC substrate was not primed with a PVC solution. Similar to examples 1 and 2 (supra), at 1.27 cm (½") overlap the N/mm² values indicate substrate failure of the PVC material rather than the strength of the bond adhering the PVC substrates together.

Polymeric substrates not comprising C-halogen bonds (examples 12b-12j) do not result in cure of the cationically curable silver salt composition. However, when these same substrates are coated with a PVC primer, cure of the silver salt composition is observed in all cases. Even after 5 minutes appreciable bond strength is observable for the polycarbonate substrate (12d), the e-coated steel substrate (12h) and the acrylonitrile butadiene styrene substrate (12f).

Example 13

Effect of PVC Primer on Fixture Rate

In an unrelated patent application the present Applicants have shown that the application of cationically curable compositions comprising metal salts, for example silver salts, to metal surfaces may result in cure of the cationically curable composition through RedOx (i.e. reduction-oxidation) chemistry. By applying a PVC primer to a number of metals, the fixture time for the silver salt compositions of the present invention on the metal surfaces was significantly enhanced.

Surfaces were cleaned with isopropyl alcohol before application of the primer. The surfaces were primed by uniformly spreading 0.5 ml of a 5% solution of PVC in THF (or methyl ethyl ketone) over the substrate bond area. The substrate was allowed to dry in air for 10 min (to allow for evaporation of the solvent) before adhesive application and bonding.

The bond overlap between the two substrates was 1.27 cm (½") overlap.

Example 13

Metal Substrates with PVC Primers Applied Thereto

| Example | Substrate | Unprimed substrate fixture time (mins) | PVC primer substrate fixture time (mins) |
|---|---|---|---|
| 13a | Glass | No cure | 5 |
| 13b | Plain Mild Steel | >30 | 3 |
| 13c | Aluminium | >60 | 3 |
| 13d | Zinc Bichromate | >60 | 15 |

-continued

| 13e | Stainless Steel | >60 | 25 |
|---|---|---|---|

| Composition | |
|---|---|
| 77.6% | (8-15) |
| 20.0% | 1,4-butanediol-divinylether |
| 2.4% | AgSbF6 |

The glass substrate, example 13a, acted as the control. No cure was observed in the absence of the PVC primer. Plain mild steel and aluminium (examples 13b & 13c) exhibited considerable increases in the rate of fixture in the presence of the PVC primer. In excess of ten and twenty-fold increases were observed respectively, in comparison to the non-PVC primed substrates. A four-fold increase in the fixture rate was observed in Example 13d, i.e. Zinc Bichromate. Similarly, a grater than two-fold increase in fixture rate was noted in the PVC primed stainless steel example (13e).

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A combination comprising:
   (a) a cationically curable composition comprising:
      a cationically curable component; and
      a non-halide silver salt, and
   (b) a surface comprising carbon-halogen covalent bonds
   wherein application of the composition to the surface initiates cure of the cationically curable component of the composition to form a cure product of the composition.

2. A combination according to claim 1 wherein the composition is a one-part composition.

3. A combination according to claim 1, wherein the non-halide silver salt comprises a counterion chosen from the group consisting of $ClO_4^-$, $BF_4^-$, $PF_6^-$, $SbF_6^-$, $AsF_6^-$, $(C_6F_5)_4B^-$, $(C_6F_5)_4Ga^-$, carborane, triflimide, bis-triflimide, and combinations thereof.

4. A combination according to claim 1, wherein the cationically curable component has at least one functional group selected from the group consisting of epoxy, vinyl, vinyl ether, oxetane, thioxetane, episulfide, tetrahydrofuran, oxazoline, oxazine, lactone, trioxane, dioxane, styrene and combinations thereof.

5. A combination according to claim 1, wherein the cationically curable component has at least one vinyl ether functional group.

6. A combination according to claim 1, wherein the composition comprises a vinyl ether component and at least one other cationically curable component selected from the group consisting of epoxy, vinyl, oxetane, thioxetane, episulfide, tetrahydrofuran, oxazoline, oxazine, lactone, trioxane, dioxane, styrene and combinations thereof.

7. A combination according to claim 1, wherein the surface comprising carbon-halogen covalent bonds is selected from the group consisting of halogenated macromolecular systems, halogenated rubbers (synthetic and natural), halogenated elastomers, halogenated polymers, co-polymers derived from vinyl chloride or vinylidene chloride, polymers plasticised with or compounded with halogenated polymers, polymer alloys plasticised with or compounded with halogenated polymers, and combinations thereof.

8. A combination according to claim 7, wherein the substrate is polyvinylchloride, polyvinylidene chloride or co-polymers thereof.

9. A combination according to claim 1 for adhering a first substrate to a second substrate, wherein at least one substrate has a surface comprising carbon-halogen covalent bonds.

10. A process of using a non-halide silver salt in a cationically curable composition for curing on a surface comprising carbon-halogen covalent bonds, steps of which comprise:
   providing a non-halide silver salt in a cationically curable composition;
   providing a surface comprising carbon-halogen covalent bonds;
   placing the non-halide silver salt in a cationically curable composition onto the surface comprising carbon-halogen covalent bonds; and
   exposing the non-halide silver salt in a cationically curable composition to conditions effective to cure the catonically curable composition.

11. A process for bonding two substrates together comprising the steps of:
   applying a composition comprising:
      a cationically curable component and
      a non-halide silver salt,
   to at least one substrate, and
   mating the first and second substrates so as to form a bond with the composition,
   wherein at least one substrate has a surface comprising carbon-halogen covalent bonds.

12. A process for bonding two substrates together comprising the steps of:
   applying a primer comprising polyvinylchloride, polyvinylidene chloride, co-polymers thereof or combinations thereof to at least one substrate;
   applying a composition comprising:
      a cationically curable component and
      a non-halide silver salt,
   to at least one substrate, and
   mating the first and second substrates so as to form a bond with the composition.

13. A substrate having a primer comprising polyvinylchloride, polyvinylidene chloride, co-polymers thereof or combinations thereof applied thereto for the purpose of priming said substrate for subsequent bonding to a second substrate using a curable composition comprising:
   a cationically curable component and
   a non-halide silver salt.

14. An assembly comprising a first substrate and a second substrate bonded together by a composition, comprising:
   a cationically curable component and
   a non-halide silver salt,
   wherein at least one substrate has a primer comprising polyvinylchloride, polyvinylidene chloride, co-polymers thereof or combinations thereof applied thereto.

15. A cured product of a composition comprising:
   a cationically curable component and
   a non-halide silver salt,
   and a primer comprising polyvinylchloride, polyvinylidene chloride, co-polymers thereof or combinations thereof.

16. A process of using a primer composition comprising polyvinylchloride, polyvinylidene chloride, co-polymers thereof or combinations thereof for the purpose of priming a first substrate for subsequent bonding to a second substrate using a composition comprising:
    a cationically curable component and
    a non-halide silver salt,
    steps of which comprise:
    providing a primer composition comprising polyvinylchloride, polyvinylidene chloride, co-polymers thereof or combinations thereof;
    providing a first substrate;
    priming the first substrate;
    providing a second substrate;
    providing a composition comprising:
    a cationically curable component and
    a non-halide silver salt;
    applying the second substrate onto the surface of at least one of the primed first substrate or the second substrate; and
    bringing together in a mating relationship the first substrate and the second substrate such that the first substrate becomes bonded to the second substrate.

17. A kit comprising:
(a) a package of a cationically curable composition comprising:
    a cationically curable component and
    a non-halide silver salt;
and
(b) a package of a primer composition comprising polyvinylchloride, polyvinylidene chloride, co-polymers thereof or combinations thereof.

* * * * *